United States Patent

Mizuguchi et al.

[11] Patent Number: 6,149,419
[45] Date of Patent: Nov. 21, 2000

[54] MANUFACTURING APPARATUS FOR MANUFACTURING DIFFERENT COLOR PELLETS

[75] Inventors: Hideki Mizuguchi; Masaharu Ishida, both of Hiroshima, Japan

[73] Assignee: The Japan Steel Works, Ltd., Tokyo, Japan

[21] Appl. No.: 09/245,351

[22] Filed: Feb. 5, 1999

Related U.S. Application Data

[62] Division of application No. 08/987,423, Dec. 9, 1997, Pat. No. 6,019,916.

[30] Foreign Application Priority Data

Dec. 10, 1996 [JP] Japan ................................. 8-346745

[51] Int. Cl.[7] .................................................. B29B 9/06
[52] U.S. Cl. .......................... 425/183; 425/185; 425/311; 425/198; 425/382.3
[58] Field of Search .............................. 425/67, 311, 313, 425/183, 185, 382.3, 464, 198

[56] References Cited

U.S. PATENT DOCUMENTS

| | | | |
|---|---|---|---|
| 3,589,163 | 6/1971 | Byrne et al. | 425/185 |
| 4,984,977 | 1/1991 | Grimminger et al. | 425/185 |
| 5,238,385 | 8/1993 | Johnson | 425/183 |
| 5,650,179 | 7/1997 | Schier | 425/313 |
| 5,723,082 | 3/1998 | Mizuguchi et al. | 425/183 |
| 5,747,077 | 5/1998 | Yoshida et al. | 425/183 |
| 5,879,720 | 3/1999 | Yoshida et al. | 425/183 |

*Primary Examiner*—Robert Davis
*Attorney, Agent, or Firm*—Sughrue, Mion, Zinn, Macpeak & Seas, PLLC

[57] ABSTRACT

A first granulating unit A for molding molten resin of one color into pellets and a second granulating unit B for molding molten resin of the other color into pellets are provided in one screw type kneading extruder 1. The first granulating unit A is made to communicate with a discharge port 2a while the second granulating unit B is blocked. After the pellets of one color are molded in this state, the discharge port 2a is made open to the outside of the apparatus, and a thermoplastic resin material of the other color is kneaded and melted by means of the screw type kneading extruder 1, and discharged to the outside of the apparatus to thereby perform cleaning operation. Next, the second granulating unit B is made to communicate with the discharge port 2a while the first granulating unit A is blocked. In this state, the pellets of the other color are molded.

3 Claims, 4 Drawing Sheets

MANUFACTURING APPARATUS FOR MANUFACTURING DIFFERENT COLOR PELLETS

This is a divisional of application Ser. No. 08/987,423 filed Dec. 9, 1997 and now U.S. Pat. No. 6,019,916, the disclosure of which is incorporated herein by reference.

BACKGROUND OF THE INVENTION

1. Field of the Invention

The present invention relates to a manufacturing method and a manufacturing apparatus of different color pellets, which can manufacture pellets with thermoplastic resin materials of different colors.

2. Related Art

Conventionally, when pellets of a thermoplastic resin material were manufactured, pellets were manufactured by means of a pellet manufacturing apparatus having a screw type kneading extruder for plasticizing the thermoplastic resin material, a strand die disposed at the front end of the screw type kneading extruder, and a cutting device for cutting strands extruded from said strand die into small pieces while cooling the strands, in such a manner that the thermoplastic resin material was plasticized and extruded from the strand die in the form of strands by the screw type kneading extruder, and then, cut into small pieces by means of the cutting device while being air-cooled or water-cooled.

However, in the conventional technique, when so-called color change was performed to manufacture pellets of a thermoplastic resin material of a color different from the color treated previously, it was necessary to suspend the operation of the pellet manufacturing apparatus so as to perform cleaning for eliminating a thermoplastic resin material of the color which was treated previously and left over in the screw type kneading extruder, the strand die, a screen changer and the cutting device, respectively. In this operation of cleaning, the thermoplastic resin material of the color which was treated previously and left over in the screw type kneading extruder could be eliminated in a comparatively short time, but the thermoplastic resin material of the color treated previously and left over in the strand die, the screen changer, the cutting means and so on except the screw type kneading extruder had to be eliminated in the condition that those parts were removed from the screw type kneading extruder so as to be decomposed. Therefore, there was a problem that it took a long time for the cleaning, and in the meantime, it was necessary to suspend the manufacturing of pellets for a long time.

SUMMARY OF THE INVENTION

Taking the foregoing problems belonging to the conventional technique into consideration, it is an object of the present invention to realize a manufacturing method of different color pellets and a manufacturing apparatus therefor, in which the cleaning in color change can be carried out in a short time without much labor.

In order to achieve the above object, according to the present invention, the manufacturing method of different color pellets is characterized in that: by using a manufacturing apparatus of different color pellets in which two granulating units are provided for a screw type kneading extruder for molding pellets out of molten resin discharged from a discharge port of the screw type kneading extruder, a thermoplastic resin material of one color is supplied to the screw type kneading extruder in the condition that one of the granulating units communicate with the discharge port while the other granulating unit is blocked so that pellets of the one color are molded by the one granulating unit, then in the condition that the discharge port is opened to the outside of the apparatus, a thermoplastic resin material of the other color is supplied to the screw type kneading extruder, kneaded, melted and released to the outside of the apparatus through the discharge port to thereby sweep the thermoplastic resin material of the one color left over in the screw type kneading extruder; and then in the condition that the discharge port is made to communicate with the other granulating unit while the one granulating unit is blocked, the thermoplastic resin material of the other color is supplied to the screw type kneading extruder so that pellets of the other color are molded by the other granulating unit.

In the manufacturing method of different color pellets according to the present invention, immediately before sweeping the thermoplastic resin material of the one color left over in the screw type kneading extruder, the screw type kneading extruder is brought into idle running so as to release the thermoplastic resin material of the one color left over in the screw type kneading extruder to the outside of the apparatus through the discharge port.

According to the present invention, the manufacturing apparatus of different color pellets is characterized by comprising a screw type kneading extruder; a passage change-over means having an inlet passage communicating with a discharge port of the screw type kneading extruder, a first outlet passage and a second outlet passage branching on the both sides of the forward end of the inlet passage, and further having a spool which can make the inlet passage communicate with only one of the first outlet passage, the second outlet passage, and the outside of the apparatus; a first granulating unit for molding pellets out of molten resin of one color discharged from the discharge port connected to the first outlet passage through a first discharge change-over valve; and a second granulating unit for molding pellets out of molten resin of the other color discharged from the discharge port connected to the second outlet passage through a second discharge change-over valve; the first discharge change-over valve including a spool which can make the first outlet passage communicate with the first granulating unit or block the first outlet passage from the first granulating unit while releasing the first outlet passage to the outside of the apparatus; the second discharge change-over valve including a spool which can make the second outlet passage communicate with the second granulating unit or block the second outlet passage from the second granulating unit while making the second outlet passage open to the outside of the apparatus.

One of the granulating units is used only for molding pellets of one color, while the other granulating unit is used only for molding pellets of the other color. Accordingly, wrong color molten resin never flows into the one and the other granulating units. At the time of color change, it is sufficient if only the screw type kneading extruder is cleaned.

DETAILED DESCRIPTION OF THE PREFERRED EMBODIMENTS

First, an embodiment of the manufacturing apparatus of different color pellets according to the present invention will be described.

Figure 1:
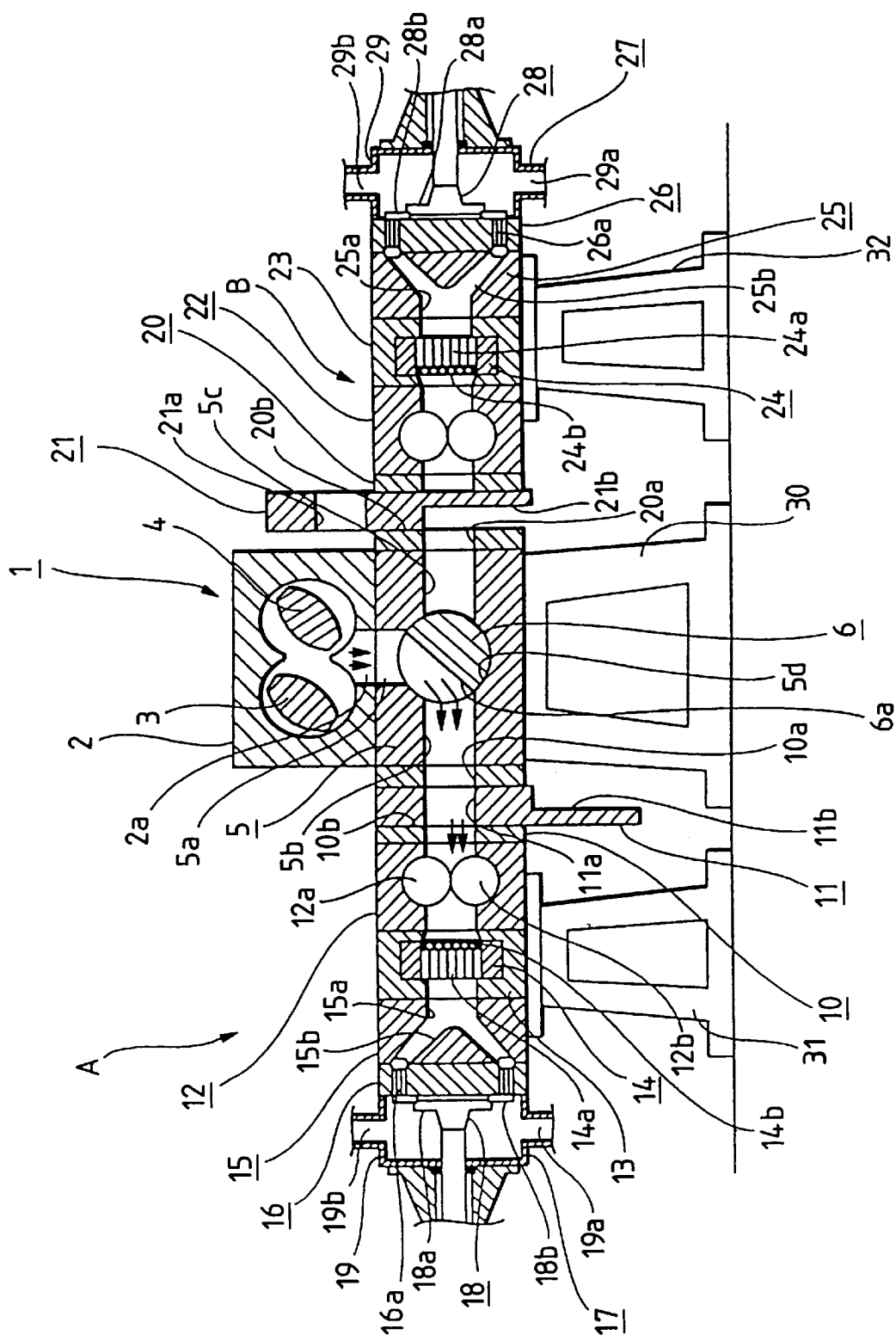
FIG. 1 is a sectional view typically showing a main portion of a different color pellet manufacturing apparatus according to the present invention.
Figure 2:
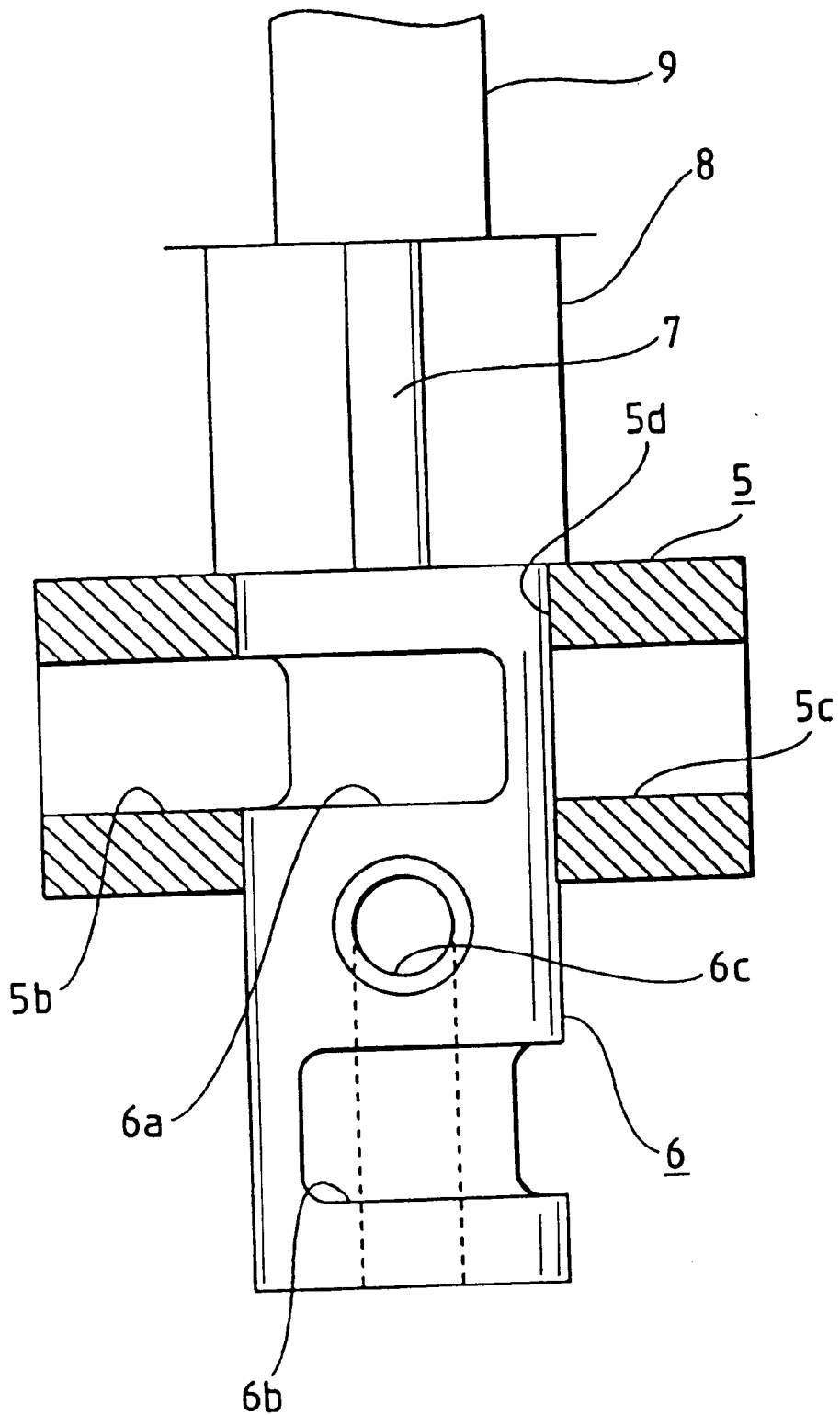
FIG. 2 is an expanded sectional view typically illustrating only a passage change-over means in the different color pellet manufacturing apparatus shown in FIG. 1.
Figure 3:
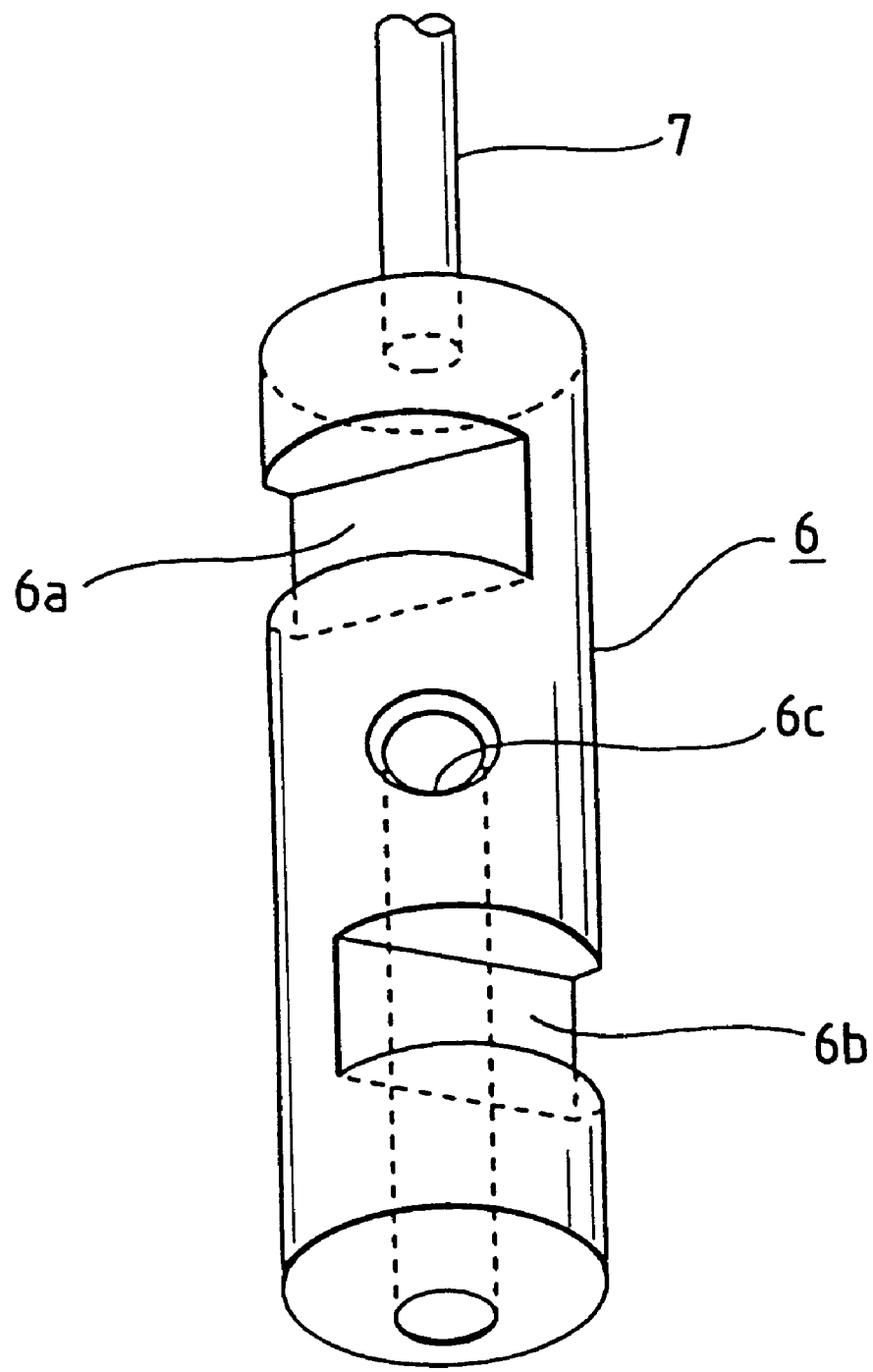
FIG. 3 is an enlarged perspective view of a spool in the passage change-over means shown in FIG. 2.
Figure 4:
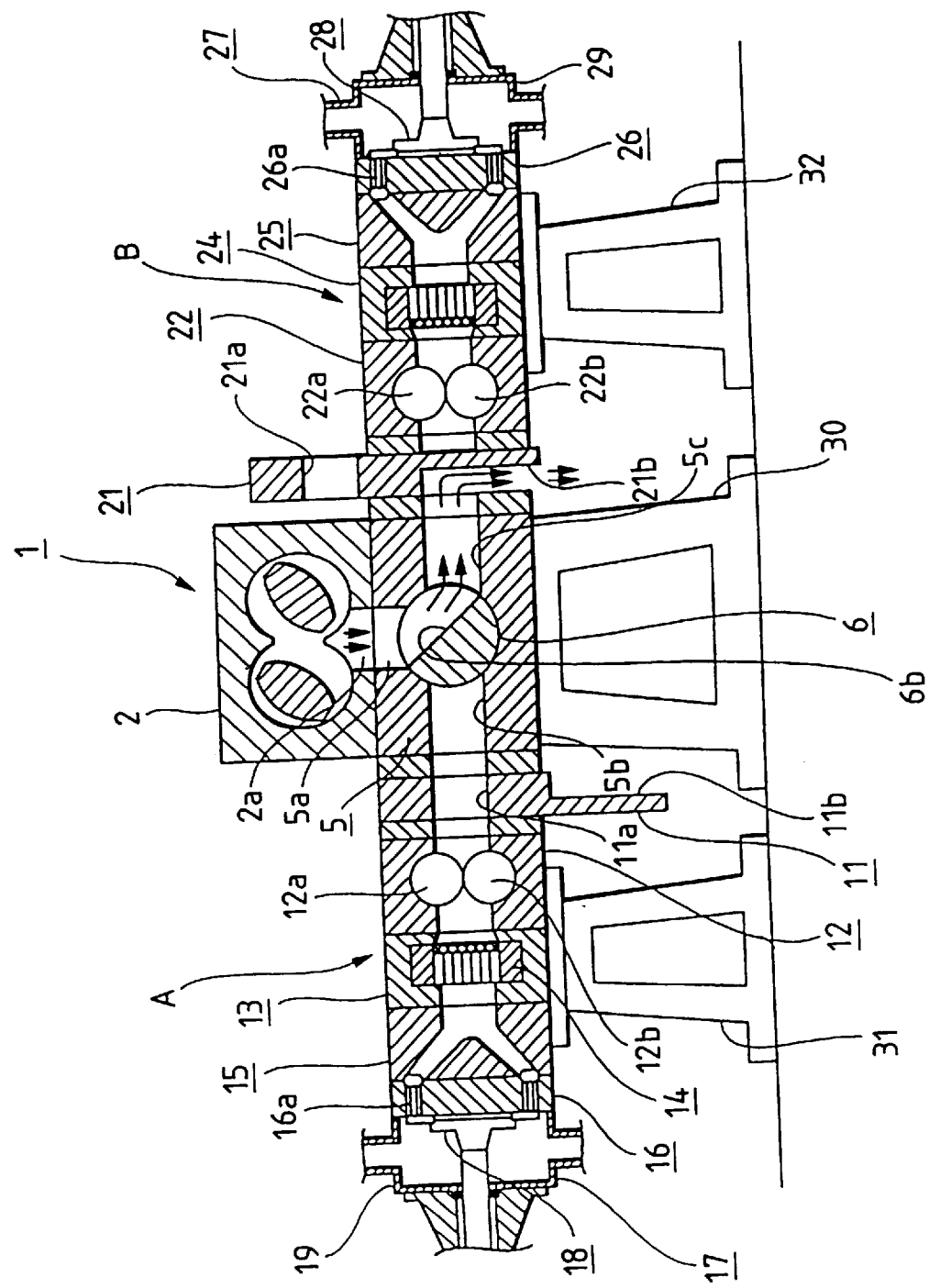
FIG. 4 is a sectional view of a main part illustrating a state at the time of cleaning operation in the different color pellet manufacturing apparatus shown in FIG. 1.

As shown in FIG. 1, a screw type kneading extruder 1 is a reversely-rotating not-interlocking biaxial screw type kneading extruder having a cylinder 2 which is heated by a not-shown heating means, and two screws 3 and 4 rotated in opposite directions to each other in the state in which their flights disposed in the cylinder 2 are not interlocking with each other. In such a configuration, a thermoplastic resin material supplied from a not-shown hopper can be kneaded, melted and discharged from a discharge port 2a provided in the front end portion of the cylinder 2 and directed downward as illustrated in the drawing.

A passage change-over means 5 supported by a first support table 30 is disposed in a lower portion on the front end side of the screw type kneading extruder 1. This passage change-over means 5 has an inlet passage 5a communicating with the discharge port 2a of the screw type kneading extruder 1, a first outlet passage 5b and a second outlet passage 5c branching from a passage branch portion of a front end portion of the inlet passage 5a into its opposite sides, a spool fitting hole 5d formed by intersecting the first outlet passage 5b and the second outlet passage 5c formed in the passage branch portion between the inlet passage 5a and the first and second outlet passages 5b and 5c, a spool 6, which will be described later, fitted into the spool fitting hole 5d slidably in the axial direction, and a rod 7 provided integrally with the upper end surface of the spool 6. The passage change-over means 5 is configured so that the spool 6 can be moved linearly in the axial direction through the rod 7 by means of a linear driving means 9 constituted by an oil cylinder, a motorized ball screw mechanism, or the like, supported on the upper end surface of a cover cylinder 8, so as to be positioned to thereby switch the passage, as will be described later.

The spool 6 has a columnar shape. In the outer circumferential surface, a first notch portion 6a opened from the side of the inlet passage 5a to the first outlet passage 5b, and a second notch portion 6b opened from the side of the inlet passage 5a to the second outlet passage 5c are formed at a predetermined distance in the axial direction, and a discharge passage 6c is provided so that its one end side is opened to a portion opposite to the inlet passage 5a in the outer circumferential surface of an approximately intermediate portion between the first notch portion 6a and the second notch portion 6b while the other end side is opened to the end surface on the opposite side to the rod. The spool 6 is configured so that the inlet passage 5a communicates only with the first outlet passage 5b when the first notch portion 6a is positioned in the passage branch portion, the inlet passage 5a communicates only with the second outlet passage 5c when the second notch portion 6b is positioned in the passage branch portion, and the inlet passage 5a communicates only with the discharge passage 6c when the upper end side opening of the discharge passage 6c is positioned in the passage branch portion.

A first granulating unit A which is one of the granulating units supported on a second support table 31 is provided, through a first discharge change-over valve 10, on the outlet side of the first outlet passage 5b of the passage change-over means 5. This first granulating unit A is provided to mold pellets of one color in such a manner that molten resin flowing out through the first outlet passage 5b is extruded in the form of strands, and cut into small pieces thereafter. This first granulating unit A has a first gear pump 12, a first screen changer 13, a first die holder 15, a first die 16 and a first cutting device 17 which are connected sequentially one after another from the first discharge change-over valve 10. In addition, a second granulating unit B which is the other granulating unit supported on a third support table 32 is provided on the outlet side of the second outlet passage 5c of the passage change-over means 5 through a second discharge change-over valve 20. This second granulating unit B is provided to mold pellets of the other color in such a manner that molten resin flowing out through the second outlet passage 5c is extruded in the form of strands, and cut into small pieces thereafter. This second granulating unit B has a second gear pump 22, a second screen changer 23, a second die holder 25, a second die 26 and a second cutting device 27 which are connected sequentially one after another from the second discharge change-over valve 20.

Since the first granulating unit A and the second granulating unit B are configured in the same manner, only the first granulating unit A will be described in detail by way of example as follows.

The first discharge change-over valve 10 has a spool 11 slidably fitted into a fitting hole 10b formed across a passage 10a of the valve 10. The first discharge change-over valve 10 is configured so that the passage 10a communicates with the first gear pump 12 when a through hole 11a formed in the illustrated upper portion of the spool 11 is positioned in the passage 10a. The spool 11 further has a notch portion 11b formed in the lower portion of the spool 11 in a range of from a position a little lower than the lower end of the through hole 11a to the lower end of the spool 11 so as to face the first discharge change-over valve 10, and when the spool 11 is positioned, on the contrary, so that the notch portion 11b is positioned in the passage 10a, the passage 10a is blocked from the first gear pump 12 and, at the same time, the passage 10a is made opened or to communicate with the outside of the apparatus through the notch portion 11b.

The first gear pump 12 has a pair of gears 12a and 12b which rotate in a condition geared with each other. The first gear pump 12 is configured to increase the pressure of molten resin flowing from the first discharge change-over valve 10 so as to discharge the molten resin to the first screen changer 13 side.

The first screen changer 13 has a screen fixing plate 14 with a plurality of through holes 14a penetrating the screen fixing plate 14 in the axial direction. The first screen changer 13 is configured so that foreign matters such as not-molten substances, etc., mixed in the molten resin can be eliminated by a screen 14b fixed to the screen fixing plate 14 on the first gear pump 12 side.

The first die holder 15 has a plurality of outlet passages 15b radially branching from one inlet passage 15a, and the first die 16 is fixed to the holder 15 on the outlet passages 15b side. In addition, the first die 16 has a plurality of nozzle holes 16a provided in the portions corresponding to the outlet passages 15b, respectively. The first die 16 is configured so that the molten resin can be extruded in the form of strands through the nozzle holes 16a.

In the first cutting device 17, a first cutter 18 with a plurality of cutting blades 18b held at a distance circumferentially in the outer circumferential edge portion of a rotary member 18a rotated by a not-shown rotating/driving means provided in a first cooling jacket 19 having an inlet port 19a and an outlet port 19b for a cooling medium. The first cutting device 17 is configured so that the strands extruded from the nozzles 16a of the first die 16 can be cut into small pieces while being cooled.

Next, the process in the manufacturing method of different color pellets according to the present invention will be described, by way of example, in the case where white pellets are manufactured after black pellets of thermoplastic resin are manufactured.

Steps of Manufacturing Black Pellets (1) In manufacturing black pellets of thermoplastic resin, first, the first notch portion 6a of the spool 6 is positioned in the passage branch portion in the passage change-over means 5 so as to make the inlet passage 5a communicate with the first outlet passage 5b, and at the same time, the first discharge change-over valve 10 is switched so that the through hole 11a of the spool 11 is positioned in the passage 10a of the valve 10 so as to make the first granulating unit A communicate with the first outlet passage 5b to thereby make the first granulating unit A ready for use.

(2) After the above-mentioned step (1), a black thermoplastic resin material is supplied to the screw type kneading extruder 1 so as to be kneaded and melted.

(3) The black molten resin kneaded and melted in the above-mentioned step (2) and discharged from the discharge port 2a of the screw type kneading extruder 1 flows into the inlet passage 5a of the passage change-over valve means 5, passes the passage 10a of the first discharge change-over valve 10 through the first notch portion 6a of the spool 6 and the first outlet passage 5b sequentially, and then flows into the first gear pump 12 so that it is pressurized by the first gear pump 12 and discharged to the first screen changer 13.

(4) The black molten resin pressurized in the above-mentioned step (3) is extruded in the form of strands through the nozzle holes 16a of the first die 16 held in the first die holder 15 after foreign matters such as not-molten substances, etc., are eliminated by the screen 14b. In the first cooling jacket 19 of the first cutting device 17, the strands are cut into small pieces so as to be black pellets while being cooled by cooling medium introduced from the inlet port 19a, and the black pellets are discharged to the outside of the apparatus together with the cooling medium flowing out through the outlet port 19b.

Cleaning Operation

After the black pellets are manufactured as described above, a cleaning operation which will be described below is performed immediately before white pellets are manufactured.

(1) In the passage change-over means 5, the discharge passage 6c of the spool 6 is positioned in the passage branch portion so as to make the inlet passage 5a communicate with the discharge passage 6c. In this state, the screw type kneading extruder 1 is put into idle running so as to discharge the black thermoplastic resin material, which is left over in the screws 3 and 4 and the cylinder 2, to the outside of the apparatus through the discharge port 2a, the inlet passage 5a and the discharge passage 6c, sequentially.

This step may be omitted in the case of color change in which influence of color mixture due to the kinds of thermoplastic resin to be used is comparatively less, for example, in the case of color change from white to black, and so on. In such a case, only the following steps may be performed.

(2) After the above-mentioned step (1), in the passage change-over means 5, the second notch portion 6b of the spool 6 is positioned in the passage branch portion so as to make the inlet passage 5a communicate with the second outlet passage 5c, and, at the same time the second discharge change-over valve 20 is switched so that the notch portion 21b of the spool 21 is positioned in the passage 20a of the valve 20 so as to make the second outlet passage 5c open to the outside of the apparatus and so as to block the passage 20a of the second discharge change-over valve 20.

(3) After the above-mentioned step (2), a white thermoplastic resin material is supplied into the screw type kneading extruder 1. After kneaded and melted in the extruder 1, the thermoplastic resin is discharged from the discharge port 2a to the outside of the apparatus through the inlet passage 5a of the passage change-over means 5, the second notch portion 6b of the spool 6, the second outlet passage 5c, and the notch portion 21b of the spool 21 of the second discharge change-over valve 20, sequentially. Thus, the cleaning operation is performed.

In the present invention, since the screw type kneading extruder 1 has a self-cleaning effect, the black thermoplastic resin material left over in the cylinder 2, the screws 3 and 4, the discharge port 2a and the inlet passage 5a of the passage change-over means 5, can be eliminated perfectly together with the white thermoplastic resin material by cleaning operation in a comparatively short time.

In addition, since the white molten resin does not flow into the first granulating unit A for manufacturing black pellets as well as the first outlet passage 5b of the passage change-over means 5, there is no case that the first granulating unit A and the first outlet passage 5b of the passage change-over means 5 are contaminated by the white molten resin.

Steps of Manufacturing White Pellets (1) After the completion of the above-mentioned cleaning operation, the spool 21 of the second discharge change-over valve 20 is switched to the through hole 21a to make the second granulating unit B communicate with the second outlet passage 5c to thereby make the second granulating unit B ready for use.

(2) After the above-mentioned step (1), a white thermoplastic resin material is supplied to the screw type kneading extruder 1. Then, the white molten resin-kneaded and melted in the screw type kneading extruder 1 is discharged from the discharge port 2a of the screw type kneading extruder 1. Then, the white resin flows into the inlet passage 5a of the passage change-over means 5, passes the passage 20a of the second discharge change-over valve 20 through the second notch portion 6b of the spool 6 and the second outlet passage 5c, sequentially, and flows into the second gear pump 22. The resin is pressurized in the second gear pump 22, and discharged to the second screen changer 23.

(3) The white molten resin pressurized in the above-mentioned step (2) is extruded in the form of strands through the nozzle holes 26a of the second die 26 held in the second die holder 25 after foreign matters such as not-molten substances, etc., are eliminated by means of the screen 24b. In the second cooling jacket 29 of the second cutting device 27, the white molten resin is cut into small pieces so as to be made into white pellets while being cooled by a cooling medium introduced from the inlet port 29a, and the white pellets are discharged to the outside of the apparatus together with the cooling medium flowing out through the outlet port 29b.

It is a matter of course that the present invention is not limited to the above-mentioned white pellets and black pellets, but the invention may be applied to the manufacture of different color pellets in any combination of two colors other than black and white colors. In addition, the screw type kneading extruder is not limited to such a reversely-rotating not-interlocking biaxial screw type kneading extruder as shown in the above embodiment, but a reverse-rotating interlocking biaxial screw type kneading extruder, a same-directionally rotating interlocking biaxial screw type kneading extruder, or a monoaxial screw type kneading extruder may be used.

With the aforementioned configuration, the present invention has an effect as follows.

In manufacturing different color pellets, the operation of cleaning for color change does not need much labor and can be finished in a relatively short time. Accordingly, it is possible to conspicuously shorten the time to suspend the operation of manufacturing pellets at the time of color change.

What is claimed is:

1. A manufacturing apparatus, for manufacturing different color pellets, comprising:

a screw extruder;

a passage change-over means;

an inlet passage communicating with a discharge port of said screw extruder;

a first outlet passage and a second outlet passage branching on sides of the forward end of said inlet passage;

a first spool for making said inlet passage communicate with only one of said first outlet passage, said second outlet passage, and the outside of said apparatus;

a first granulating unit for molding pellets out of molten resin of a first color discharged from said discharge port connected to said first outlet passage through a first discharge change-over valve;

a second granulating unit for molding pellets out of molten resin of a second color discharged from said discharge port connected to said second outlet passage through a second discharge change-over valve;

a second spool provided with said first discharge change-over valve, said second spool being movable to a first position for communicating said first outlet passage with said first granulating unit, and being movable to a second position for blocking said first outlet passage from said first granulating unit while making said first outlet passage open to the outside of said apparatus; and a third spool provided with said second discharge change-over valve, said third spool being movable to a first position for communicating said second outlet passage with said second granulating unit, and movable to a second position for blocking said second outlet passage from said second granulating unit while making said second outlet passage open to the outside of said apparatus.

2. A manufacturing apparatus according to claim 1, wherein said first granulating unit includes a first screen changer, and said second spool is positioned between said first spool and said first screen changer.

3. A manufacturing apparatus according to claim 1, wherein said first granulating unit includes a first pump, and said second spool is positioned between said first spool and said first pump.

* * * * *